United States Patent [19]
Leiber

[11] 3,881,567

[45] May 6, 1975

[54] SERVO-ASSISTED STEERING ARRANGEMENT

[75] Inventor: Heinz Leiber, Leimen, Germany

[73] Assignee: Teldix GmbH, Heidelberg, Germany

[22] Filed: Dec. 14, 1973

[21] Appl. No.: 424,784

[30] Foreign Application Priority Data
Dec. 23, 1972   Germany............................ 2263347

[52] U.S. Cl............................................ 180/79.2 R
[51] Int. Cl............................................... B62d 5/06
[58] Field of Search ................................ 180/79.2 R

[56] References Cited
UNITED STATES PATENTS

| | | |
|---|---|---|
| 2,487,618 | 11/1949 | Twyman........................ 180/79.2 R |
| 2,990,902 | 7/1961 | Cataldo ....................... 180/79.2 R |
| 3,011,579 | 12/1961 | Milliken et al................. 180/79.2 R |
| 3,426,863 | 2/1969 | Hanson......................... 180/79.2 R |

FOREIGN PATENTS OR APPLICATIONS

| | | | |
|---|---|---|---|
| 1,206,869 | 9/1970 | United Kingdom............ | 180/79.2 R |

*Primary Examiner*—Kenneth H. Betts
*Assistant Examiner*—John A. Pekar
*Attorney, Agent, or Firm*—Spencer & Kaye

[57] ABSTRACT

A servo-assisted steering arrangement for a vehicle comprises a pressure medium actuated piston and cylinder device for actuating the steering gear, and a plurality of electrically actuated valves for controlling the piston and cylinder device in accordance with electrical signals from a sensor detecting actuation of the vehicle steering wheel.

36 Claims, 5 Drawing Figures

SERVO-ASSISTED STEERING ARRANGEMENT

BACKGROUND OF THE INVENTION

The invention relates to a servo-assisted steering device in which, as a result of a steering wheel rotation, valves for pressure medium supplied under pressure are actuated, which pressure medium then displaces an adjusting piston which is in engagement with the steering device.

Such a servo-assisted steering device is known from German Pat. No. 1,214,554. Valve control in this case is achieved with a very complicated mechanical control device.

Since it is likely that future motor vehicles will be provided with a hydraulic center which can be used for different purposes, it is sensible also to achieve servo-assisted steering by using hydraulics. When using a hydraulic center, a separate pressure generator can be dispensed with.

SUMMARY OF THE INVENTION

It is an object of the invention to so modify a known hydraulic servo-assisted steering device that a simplification and cost redution occurs.

According to the invention, there is provided a servo assisted steering arrangement for a vehicle comprising piston and cylinder means for actuating the steering gear of said vehicle, a source of pressure medium, a plurality of valves controlling admission and release of said pressure medium to and from said piston and cylinder means to actuate said piston and cylinder means, electrically actuatable control means for controlling operation of said plurality of valves and sensing means for sensing actuation of a steering wheel of said vehicle and for providing an electrical control signal for controlling said electrically actuatable control means in response to said actuation of said steering wheel.

DESCRIPTION OF THE DRAWINGS

The invention will now be described in greater detail, by way of example, with reference to the drawings, in which:-

FIG. 2a shows a sectional view of one form of torque sensing element for the embodiment of FIG. 1;

FIG. 2b is a sectional view taken on the line 1—1 of FIG. 2a;

DESCRIPTION OF THE PREFERRED EMBODIMENT

Figure 1:
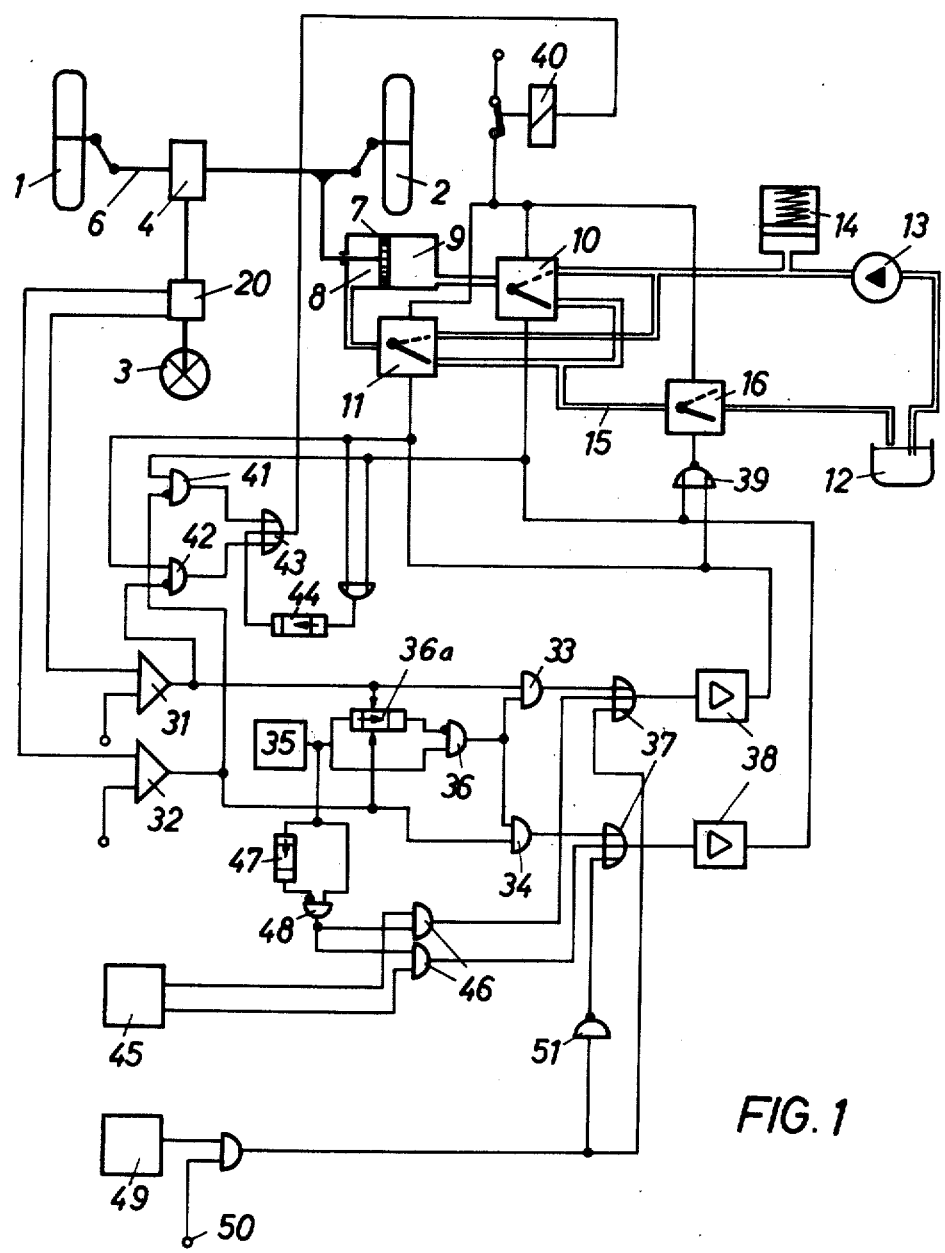
FIG. 1 shows one form of embodiment of the invention in basic-outline.

Basically the invention proposes a servo-assisted steering arrangement comprising a pressure medium actuated piston and cylinder device for actuating the steering gear, a plurality of valves for controlling supply and removal of the pressure medium to and from the piston and cylinder arrangement, electrically actuable control means for the valves and sensing means, e.g. a torque measuring device, for providing an electrical signal in dependence on movement of the steering wheel, which signal is used to control the electrically actuatable control means.

A sensing element for sensing the angle of rotation of the steering wheel may be used instead of the torque sensing element. In the servo-assisted steering arrangement in accordance with the invention a mixture of electronic and hydraulic means are thus used. In addition to carrying out the above-mentioned objects, specific embodiments of the invention may have the additional advantage that additional control parameters can be included for controlling the valves.

In accordance with one embodiment of the invention, actuation of the valves does not take place continuously but a pulsed operation is carried out by means of a pulse signal. This form of operation has the advantage that a restoring moment acts on the steering wheel during the pulse pauses.

With pulsed operation, further relevant parameters can be used as control factors in a simple manner by varying the pulse-pause ratio of the pulses in relation to these factors. If an astable multivibrator is used as the pulse generator, its time constant can, for example, be varied. Advantageously with large changes in the steering wheel turning angle, a signal dependent thereon may be used to increase the pulse-pause ratio with increasing angle of turn. On the other hand, the pulse-pause ratio can be reduced with increasing vehicle speed.

The torque sensing element may comprise, for example, at least one magnet and a magnetic field-sensitive semiconductor for each of the two directions of rotation of the steering arrangement. These components are so arranged between the actual steering linkage and the steering wheel that on rotation of the steering wheel, against a spring force, a relative movement occurs between the magnets and the semiconductors. Thus control voltages arise at the semiconductors. Advantageously, the single magnet, or, when using two separate magnets, these two magnets, are arranged to be at the same distance from the semiconductors in their rest position so that the difference of the semiconductor output signals is O. As a result, one of these output signals must predominate on rotation of the steering wheel until follow-up by the servo-assisted steering system and the valves are controlled accordingly. Two two-way valves can be used for control of the actuating piston. When actuating one of these valves, the chamber on one side of the actuating piston is connected to a pressure source and movement of the piston occurs. In the non-energized state of the valve, both chambers are connected to a return line into which a further magnetic valve can be connected. This third magnetic valve is actuated with each of the two control valves and opens the return line. Damping of the steering effect can be achieved by this valve. A further possibility of the steering damping will be described hereafter.

In accordance with a further form of the invention, the servo-assisted steering arrangement can be switched off above a predetermined vehicle speed of e.g. 10 km/h to save energy, since the steering effect is relatively light in a rapidly moving vehicle. However, in order to have assisted steering in the case of relatively high speed steering action and also large steering torques or large angles of rotation of the steering wheel, the speed range in which the steering assistance remains operative is extended upwardly by means of corresponding signals responsive for example to a certain torque.

With servo-assisted steering in accordance with the invention in a vehicle having a separate anti-lock control for the two steered wheels, a yawing moment which may be generated by different brake forces at the two wheels can be avoided. This can be achieved by determining the brake force at these wheels, for example, by measuring the controlled brake pressure, and comparing the two brake pressures. If any deviation is present the comparison means produces a signal which corresponds to this deviation in magnitude and sense (thus indicating which wheel has the lower brake pressure). This signal is then compared with a signal which depends in magnitude and sense on the angle of turn of the steering wheel. If the pressure difference signal exceeds a certain value than a certain correlation exists between the two compared values. If this is not the case, then, depending on which signal predominates, one of the vales is actuated to provide a corresponding rotation of the steering arrangement and thus a counter moment dependent on the deviation is produced by the steering arrangement to counteract the yawing moment. Preferably valve actuation also takes place here in a pulsed manner. If, for example, when the wheels are aligned for guiding the vehicle in a straight line, the wheel brake pressure on the left hand wheel is greater than at the right hand wheel, then a shift of the steering in the sense of movement for a right turn is effected in order to compensate for the resulting yawing moment. In the case where the steering linkage has already been turned as a result of turning of the steering wheel, the steering angle present has to be taken into account. The second comparison stage with predetermined correlation threshold serves for this purpose.

As well as using torque and vehicle speed for control of the valve actuating signals, the rotary speed of the steering wheel can be used. This rotary speed is measured and the measurement is used in such a way in the associated equipment that, with an increasing speed of rotation of the steering wheel, an increasingly rapid shift of the actuating piston and thus of the steering linkage takes place. If a pulsed actuation of the adjusting element is used, than the measuring signal representing the rotary speed of the steering wheel is preferably used to vary the pulse-pause ratio.

The signal of the torque sensing element which represents the torque applied to the steering wheel and the signal representing the rotary speed of the steering wheel can be used in common to control the valve actuating signal, for example, for varying the pulse-pause ratio again, such that, with increasing signal values, the pulse-pause ratio is varied to provide a more rapid shift of the steering elements or linkage. Furthermore, the influence of the signal values representing the rotary speed and/or the torque on the pulse-pause ratio depend on the vehicle speed, that is to say, in such a manner that with increasing vehicle speed the influence of the torque or the rotary speed on the pulse-pause ratio becomes less.

The torque sensor can be so constructed that in a predetermined range about its zero position, a predetermined counter moment acts to opposed the steering wheel movements and this counter moment may be arranged to increase with further angular movement of the steering wheel. Where this counter moment is provided by a spring, a second spring can be arranged to be made operative to a predetermined effect upon movement of the steering wheel from the zero position.

Preferably the control element (i.e. actuating piston etc.) is built as a unit with the steering damper and, if necessary, the steering gear.

In order to ensure that, if an error occurs in the servo-assisted steering arrangement, direct steering can take place a safety circuit is provided which detects whether, on energization or actuation of a valve, the corresponding control signal is present. If this is not the case, then the valve current is switched off, and preferably the current supply for the valves is interrupted in toto. A time circuit can also monitor whether a valve is actuated for longer than a predetermined time. Then too the servo-assisted steering is switched off. This situation applies with pulsed actuation if this lasts for a long time.

Servo-assisted steering designed in accordance with the invention can be also used to draw the attention of the driver of the vehicle to the fact that a fault has occurred such as failure of the anti-lock controller, failure of a brake circuit etc. or to warn him that he is to close to the vehicle in front. Here the errors occurring or the warning signal are used to actuate a pulse generator which then alternately energizes the magnetic valves and thus produces a vibration at the steering wheel. The frequency and the pulse length are preferably so chosen that the valves do in fact respond, but only for a very short period.

The steering device in accordance with the invention also makes it possible to guide a vehicle automatically along a predetermined line, which can be scanned inductively for example. the conductor sensor which effects guidance of the vehicle produces signals known per se if the vehicle begins to deviate from its desired path. These signals can be used to actuate the magnetic valves and as a result carry out a correction of the vehicle's course. The additional expenditure for this is very low if the above described servo-assisted steering device is present, but it is also basically possible to carry out such guidance with the use of the valves, the piston connected to the steering gear and the pressure source without these parts being used for the servo-assisted steering. Preferably the actuation is also pulsed in this case.

Referring now to the drawings, in FIG. 1 the steered wheels of a vehicle are given the reference numerals 1 and 2. The wheels 1 and 2 are turned by means of the steering wheel 3 through the steering gear 4 and the steering linkage 6. A piston 7 is connected to the steering linkage 6. Chambers 8 and 9 present on both sides of this piston can be connected, by means of two two-way valves 10 and 11, to a pressure source, which comprises a pump 13 for extracting fluid from the fluid reservoir 12 and the pressure reservoir 14. Two electromagnetic valves 10 and 11 connect the chambers 8 and 9 to a return pipe 15 in their non-energized state. A further electromagnetic valve 16 is connected into the return pipe 15 and permits the return flow of the hydraulic fluid in its non-energized state.

Figures 2A, 2B:
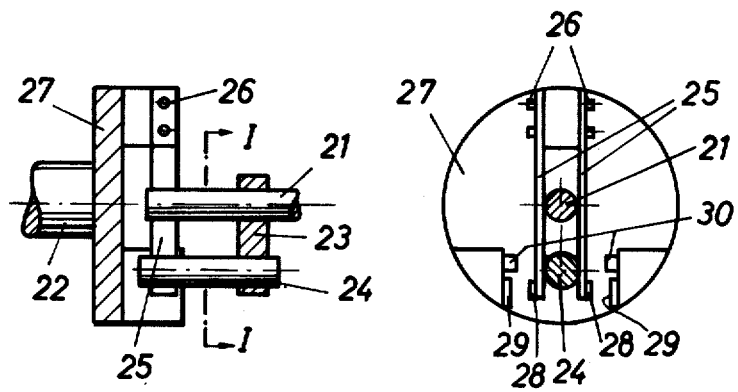

A torque sensing element 20 is connected into the steering worm sector shaft. This torque sensing element produces, at its two output lines, a voltage corresponding to the torque applied by means of the steering wheel 3. The torque sensing element can be constructed for example as shown in FIGS. 2a and b. FIG. 2a is a longitudinal section, and FIG. 2b is a sectional view taken on the line 1—1 of FIG. 2a. The steering wheel should here be connected to the shaft 21, the steering gear 4 to the shaft 22. On rotation of the shaft 21, a part 23 connected thereto and also a pin 24 are pivoted about the axis of the shaft 21. This pivoting takes place, according to the direction of rotation of the steering wheel, against the force of one of a pair of leaf springs 25. These leaf springs are connected at 26 to a part 27 which is in turn connected to the output shaft 22. The springs 25 carry permanent magnets 28. During the pivoting movement, one of these permanent magnets 28 moves towards an associated magnetic-field sensitive semiconductor 29, whereby a voltage dependent on the torque is produced. The magnet concerned depends on the direction of movement of the steering wheel. With the failure of the servo-assisted steering arrangement, the shafts 21 and 22 rotate together because of the cooperation between stops 30 and the pin 24.

The voltage which appears at one of the output lines in dependence on the direction of rotation passes to an operational amplifier 31 or 32 which produces an output, if the input signal exceeds a value predetermined by the operational amplifiers. From there the voltage passes to one of a pair of AND-gates 33 and 34, and to the time element 36a of a pulse generator. This pulse generator has, in addition to the time element 36a which produces an output signal a predetermined time after application of the input signal, a pulse generator unit 35 and an AND-gate 36 with one inverted input. The output of the generator is a pulse which begins with the emission of a pulse from the element 35 and ends after the time predetermined by the time constant of the time element 36a. The pulse length is dependent on torque because the time constant of the time element 36a is varied by the level of the voltage at the output of the operational amplifier such that the time constant becomes larger with increasing voltage. The output pulses passed/to the AND-gate 33 and 34, are passed by one of the gates, which gate is dependent on the direction of rotation of the steering wheel. The pulses then pass through an associated OR-gate 37 and through an associated amplifier 38 to one of the valves 10 or 11. Thus one of the chambers 8 or 9 is connected for a time to the pressure source 13/14. The piston 7 is displaced and the steerable wheels are turned in the appropriate direction. Upon response of either of the valves 10 or 11, the valve 16 drops out because an OR-gate 39 which controls the valve 16 has an inverted output. In this condition the valve 16 allows pressure fluid to flow back to the reservoir. As soon as the required variation of the steering gear has been carried out, pulsed operation of the valve stops.

A relay 40 is energized if an error or fault is detected and this cuts off the current to all the valves 10, 11 and 16, so that direct steering of the steerable wheels by means of the steering worm sector is possible without interference from the incorrectly operating servosystem. The relay 40 is energized if a signal appears at the output of one of the amplifiers 38 without a signal being present at the output of the associated operational amplifier 31 or 32. AND-gate 41 and 42 and an OR-gate 43 are provided for this purpose and apply a signal to relay 48 if this condition is present. If an actuating signal for one of the valves 10 and 11 lasts for a predetermined time, indicating too long an actuation of these valves, a signal is again applied to the relay 40. This predetermined time is determined by a time element 44.

As already mentioned, the vehicle can also be steered along a line using the pressure source and the valves automatically. For this purpose, a sensing element 45 must be provided for sensing the vehicle deviation and provide a signal related thereto. This signal is applied to one of the AND-gate 46 to allow passage of the pulses of a pulse generator comprising the pulse generator unit 35, a time element 47 and an AND-gate 48. These pulses are fed to the valves and thus effect steering correction. With the addition of this deviation correction facility the safety circuit must be modified somewhat. Finally, the driver can be made aware or be warned of the presence of an error largely using the existing equipment. For this purpose a relatively high frequency pulse generator 49 with square or sinusoidal shaped output pulses is provided. A signal which indicates an error is fed into the circuit at the terminal 50. This signal is fed to the associated AND-gate and permits pulses from the generator 49 to pass through the AND-gate and reach the valve 11. The valve 10 is in the pauses between these pulses as a result of the provision of an inverter 51. As a result of this alternating energization of the valves 10 and 11, the steering angle achieved by the servo-assistance is basically to small, but the driver will feel vibration which warns him or makes him aware of the presence of an error.

Figure 3:
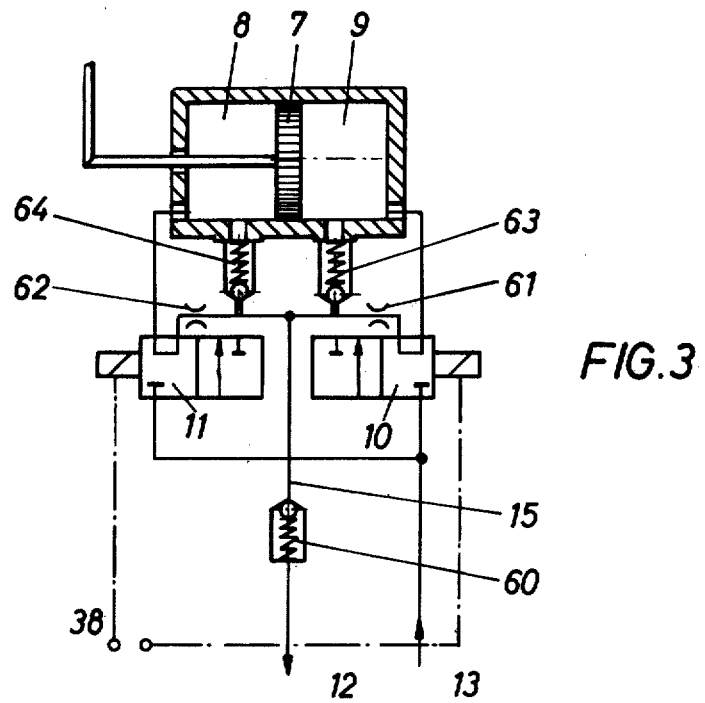
FIG. 3 shows a valve combination for achieving displacement of the adjusting piston with steering damping.

FIG. 3 of the drawing shows only the cylinder with the chambers 8 and 9 and the actuating piston 7 and the associated valve arrangement for controlling this. The valves shown correspond to the valves 10 and 11 of FIG. 1, and thus connect the chambers 8 and 9 in the rest position to the return pipe 15. A valve device 60 is connected into the return pipe 15 and opens when a certain over pressure exists on the valve side thereof. It permits pressure medium to flow out and back to the reservoir 12. The chambers 8 and 9 are here connected to the return pipe 15 by way of throttles 61 and 62. For example, a damping effect can be achieved in this way such that, for example, if the steering is knocked the effect of this is damped down because the steering can only slowly follow the knock as only a slow movement of pressure medium can take place. Valve devices 63 and 64, which allow pressure medium to flow between the chambers 8 and 9 when pressure differences exist between the two chambers serve to achieve a rapid pressure equalization between return pipe 15 and the chambers 8 and 9, for instance in the case where a piston displacement is effected externally.

Further possibilities for the control of the valve actuating signals of FIG. 1 will now be explained with reference to FIG. 4. The amplifiers 31 and 32 which are connected to the torque signal generator of FIG. 1 are here given the reference numerals 31' and 32'. The AND-gates 33 and 34 are also present here as gates 33' and 34'. These are connected, as previously, to the amplifiers 38 of FIG. 1. The pulse generator unit 35 of FIG. 1 is given the reference numeral 35' and the controllable element which determines the pulse-pause ratio of the generator output is given the reference numeral 36'.

A signal, which is dependent on the vehicle speed, is fed to a terminal 70. This signal is converted in an element 71 to produce an output signal which decreases with increasing vehicle speed and which is fed by way of an OR-gate 72 to the element 36'. Thus the pulse width becomes smaller with increasing vehicle speed and, as a result, a reduction of the influence of a certain steering angle is obtained with increasing speed. The output signals of the amplifiers 31' and 32' also affect the pulse-pause ratio by way of lines 73 and 74.

Finally a further control of the pulse-pause ratio is provided which is dependent on the speed of rotation of the steering wheel. In this case the speed $\alpha$ of rotation of the steering wheel is measured by means of an element 75 and a signal dependent thereon is fed to the element 36'. An element 76 serves to control the output signal of the measuring elements 75 in dependence on the vehicle speed $v_F$. The curve of the output signal of the element 76 plotted against the vehicle speed and assuming a constant input but a variable vehicle speed, is indicated adjacent the element 76 and given the reference numeral 76a. In a similar manner, the measured value M for the torque is controlled in dependence on the vehicle speed $v_F$ by varying the amplification of the amplifiers 31' and 32'. A diagram of the torque M plotted against the vehicle speed $v_F$ is shown at 32'a.

Figure 4:
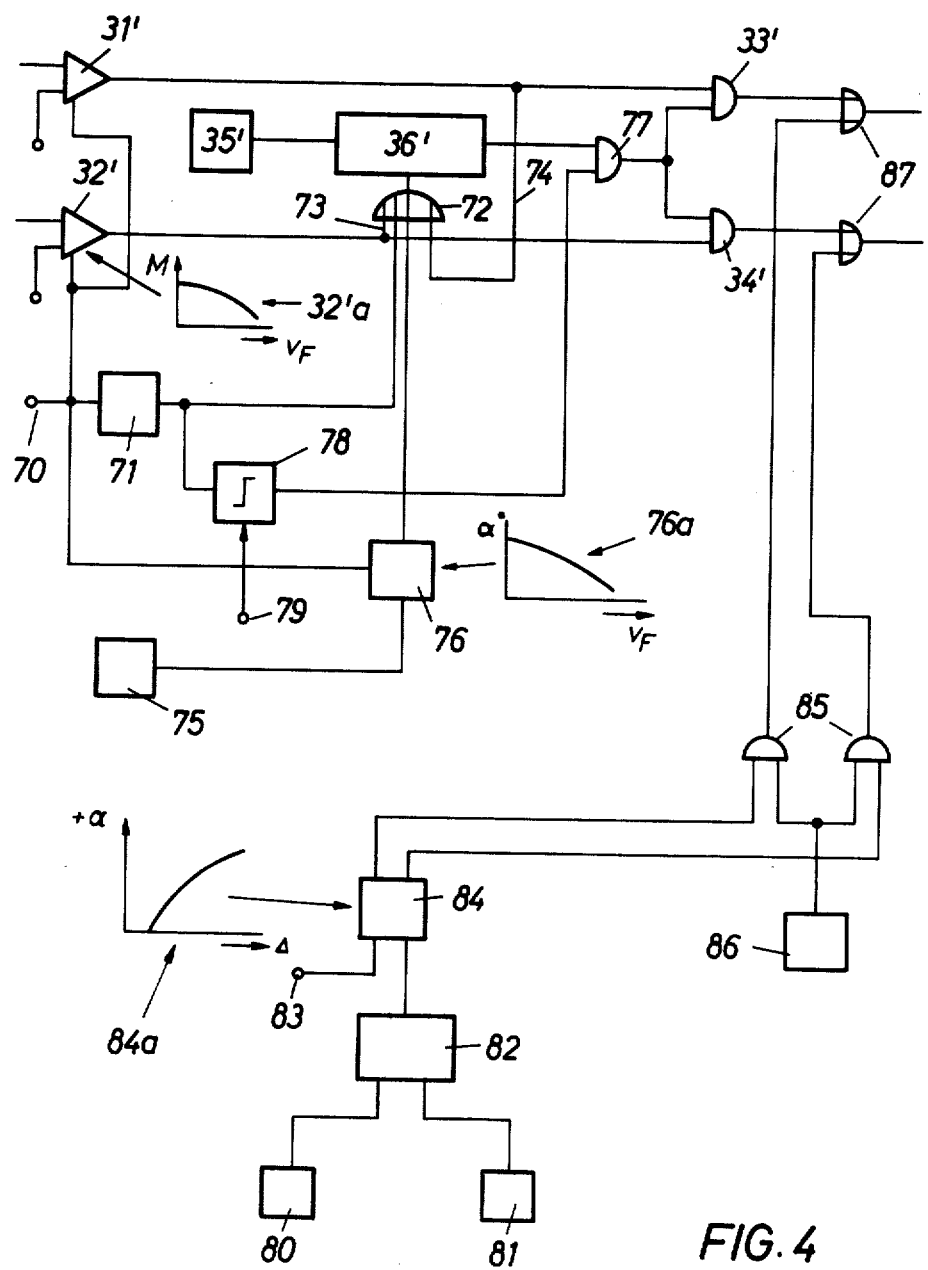
FIG. 4 shows an embodiment corresponding to FIG. 1 but with additional controls.

Since servo-assisted steering is not absolutely necessary at higher speeds because of the lightness of the steering, in FIG. 4 a switching possibility is provided for. This can be achieved by means of a gate 77 which allows the pulses of the element 36' to pass through only if the output voltage of the element 71 lies above the threshold provided by an element 78. This threshold thus represents a predetermined vehicle speed. This threshold can be varied by means of a torque or rotary speed dependent value fed to the element 78 via the terminal 79. The variation of the threshold can be such that if large signals are present, the servo-assisted steering is still operative even at high speeds.

It is also possible, with the servo-assisted steering in accordance with the invention, to compensate for a yawing moment sometimes caused by an anti-lock controller. To achieve this, two pressure sensing elements 80 and 81 are provided for sensing the controlled pressure applied to the wheel brakes of the steered wheels. These sensors supply values proportional to the pressure at the steered wheels to a comparator 82 which in turn produces a signal dependent on the magnitude and the sign of the difference of the pressure existing between the two wheels. This latter signal is compared in an element 84 with a signal dependent on operation of the steering wheel applied to terminal 83. Diagram 84a shows the predetermined correlation between the steering wheel angle $\alpha$ and the brake pressure differences in one direction of turn. An output signal on one of the output lines opens one of a pair of gates 85 to allow passage for the pulses of a pulse generator 86. The pulses then pass by way of OR-gates 87 to the amplifiers and valves and, as a result, cause displacement of the final control element. By this means, with the existence of a certain pressure difference at the front wheel brakes, indicating a yawing moment, in addition to the steering wheel angle present, a steering adjustment is initated to produce a counter yawing moment.

It will be understood that the above description of the present invention is susceptible to various modifications, changes and adaptations.

What is claimed is:

1. In a servo-assisted steering arrangement for a vehicle including a servo system comprising: piston and cylinder means for actuating the steering gear of said vehicle; a source of pressure medium; a plurality of valves controlling admission and release of said pressure medium to and from said piston and cylinder means to actuate said piston and cylinder means; electrically actuatable control means for controlling operation of said plurality of valves; and sensing means for sensing actuation of a steering wheel of said vehicle and for providing an electrical control signal for controlling said electrically actuatable control means in response to said actuation of said steering wheel; the improvement wherein said electrically actuatable control means includes pulse generation means for providing a train of output pulses, and switch means responsive to said electrical control signal from said sensing means for causing said train of output pulses to be applied to said valves for actuating same whereby pulsed operation of said valves occurs upon each actuation of said control means.

2. An arrangement as defined in claim 1, wherein said sensing means comprises a torque sensing element for sensing the torque produced by movement of said steering wheel.

3. An arrangement as defined in claim 2 comprising further sensing means for measuring the rotary speed of said steering wheel; and wherein said control means is responsive to both said sensing means and said torque sensing element to increase the speed of operation of said piston and cylinder means with increasing torque and increasing rotary speed of said steering wheel.

4. An arrangement as defined in claim 3, wherein said pulse generator means is variable pulse-pause ratio pulse generator means and control means includes means responsive to both said further sensing means and said torque sensing element for varying said pulse-pause ratio of said pulse generator means.

5. An arrangement as defined in claim 3 and comprising means for controlling the output of said further sensing means for decreasing the influence of said output of said further sensing means with increasing vehicle speed.

6. An arrangement as defined in claim 3 and comprising means for controlling the output of said torque sensing element for decreasing the influence of said output of said torque sensing element with increasing vehicle speed.

7. An arrangement as defined in claim 3 and comprising means for controlling the output of said further sensing means and said torque sensing element for decreasing the influence of said output of said further sensing and said torque sensing element with increasing vehicle speed.

8. An arrangement as defined in claim 2, wherein said torque sensing element includes means for causing the torque required to be applied to the steering wheel to increase slowly with the turning angles of said steering wheel in a predetermined range about its zero position and for increasing the torque required to be applied to the steering wheel more rapidly with further turning of said steering wheel.

9. An arrangement as defined in claim 2, wherein said torque sensing element comprises at least one magnet and a magnetic field-sensitive semiconductor for each sense of rotation of said steering wheel and means for effecting relative movement between said magnet and associated magnetic field sensitive semiconductor when said steering wheel is rotated.

10. An arrangement as defined in claim 1, wherein said sensing means comprises a rotary movement sensing device for sensing rotary movement of said steering wheel.

11. An arrangement as defined in claim 1, wherein said plurality of valves comprise electromagnetic valves 12. An arrangement as defined in claim 11, further comprising a safety circuit including comparison means for determining whether a control signal is present on actuation of said electromagnetic valves and means for switching off said servo system in the absence of said control signal.

13. An arrangement as defined in claim 11, further comprising a safety circuit including a time element for timing the actuation of said electromagnetic valves and switching off said servo system when said electromagnetic valves are actuated for a predetermined time.

14. An arrangement as defined in claim 11, further comprising a further pulse generator means for providing an output upon failure of normal operation of a unit of said vehicle, and means for feeding the output of said pulse generator to said electromagnetic valves for rapid alternating control of said steering gear.

15. An arrangement as defined in claim 11, and comprising sensing means for sensing whether said vehicle is following a predetermined line and means for actuating said electromagnetic valves on deviation from said line to return said vehicle to said line.

16. An arrangement as defined in claim 11, wherein said sensing means measures the rotary speed of said steering wheel and said control means is responsive to said sensing means for controlling said electromagnetic valves to increase the speed of operation of said piston and cylinder means with increasing rotary speed of said steering wheel.

17. An arrangement as defined in claim 16, wherein said pulse generator means includes means responsive to said sensing means for varying the pulse pause ratio of said train of output pulses.

18. An arrangement as defined in claim 11, and comprising a common return line for said pressure medium, two two-way electromagnetic valves forming said electromagnetic valves and a further electromagnetic valve in said return line for actuation with either of said two two-way electromagnetic valves.

19. An arrangement as defined in claim 1, wherein said pulse generator means comprises a variable output pulse generator whose pulse-pause ratio is dependent on rotation of said steering wheel so as to increase said pulse-pause ratio with increased rotation of said steering wheel.

20. An arrangement as defined in claim 1, wherein said control means includes ratio control means for controlling the pulse pause ratio of said pulse generator means in dependence on vehicle speed so as to decrease said pulse-pause ratio with increasing vehicle speed.

21. An arrangement as defined in claim 7, and comprising a cylinder in said piston and cylinder means, a piston in said cylinder, a first chamber of said cylinder on one side of said piston a second chamber of said cylinder on the other side of said piston, a return line for said pressure medium, and two throttles connected between said first and second chambers and said return line.

22. An arrangement as defined in claim 21, and further comprising a unidirectional valve in said return line operable at a predetermined pressure to permit flow of the pressure medium toward said source.

23. An arrangement as defined in claim 21, and comprising a respective unidirectional valve connected between each said first and second chambers and said return line and operable at a predetermined pressure difference to open towards said chambers.

24. An arrangement as defined in claim 7, and further comprising operation control means for permitting operation of said electrically actuatable control means only below a predetermined vehicle speed.

25. An arrangement as defined in claim 24, wherein said operation control means comprises a gate and a threshold.

26. An arrangement as defined in claim 24, and comprising varying means for varying said predetermined vehicle speed upwards with certain parameters of operation of said steering wheel.

27. An arrangement as defined in claim 26, and comprising varying means for varying said predetermined vehicle speed upwards in response to a high torque of said steering wheel.

28. An arrangement as defined in claim 26, and comprising varying means for varying said predetermined vehicle speed upwards in response to a large rotary angle of said steering wheel.

29. An arrangement as defined in claim 26, and comprising varying means for varying said predetermined vehicle speed upwards in response to a high torque and a large rotary angle of said steering wheel.

30. An arrangement as defined in claim 26, wherein said operation control means comprises a gate and a threshold and said varying means comprises means for displacement of the threshold value of said threshold.

31. An arrangement as defined in claim 7, and comprising an intergral unit containing steering dampers and said piston and cylinder means.

32. An arrangement as defined in claim 7, and comprising an intergral unit containing steering dampers, said piston and cylinder means and said steering gear.

33. An arrangement as defined in claim 1 and comprising two pressure sensing elements in brake lines to two steered wheels of said vehicle operated on by an anti-lock control system with separate control for said two steered wheels, first comparison means responsive to said pressure sensing elements for comparing brake pressures in said brake lines to said two steered wheels and for producing a deviation signal elements brake pressures are different, means for producing a deflection signal representative in magnitude and sense of deflection of said steered wheels, second comparison means dor comparing said deflection signal with said deviation signal and means for controlling said electromagnetic valves when said comparison means detects a deviation from a predetermined correlation to vary said steering gear accordingly.

34. In a servo-assisted steering arrangement for a vehicle comprising: piston and cylinder means for actuating the steering gear of said vehicle; a source of pressure medium; a plurality of valves controlling admission and release of said pressure medium to and from said piston and cylinder means to actuate said piston and cylinder means; electrically actuatable control means for controlling operation of said plurality of valves and sensing means for sensing actuation of a steering wheel of said vehicle and for providing an electrical control signal for controlling said electrically actuatable control means in response to said actuation of said steering wheel; the improvement wherein said sensing means includes a torque sensing element for sensing the torque produced by movement of said steering wheel, and wherein said torque sensing element comprises at least one magnet and a magnetic field-sensitive semiconductor for each sense of rotation of said steering wheel and means for effecting relative movement between said magnet and magnetic field sensitive semiconductor when said steering wheel is rotated.

35. In a servo-assisted steering arrangement for a vehicle including: piston and cylinder means for actuating the steering gear of said vehicle; a source of pressure medium; a plurality of electromagnetic valves controlling admission and release of said pressure medium to and from said piston and cylinder means to actuate said piston and cylinder means; electrically actuatable control means for controlling operation of said plurality of valves; and sensing means for sensing actuation of a steering wheel of said vehicle and for providing an electrical control signal for controlling said electrically actuatable control means in response to said actuation of said steering wheel; the improvement comprising a common return line for said pressure medium, two two-way electromagnetic valves forming said electromagnetic valves, and a further electromagnetic valve in said return line and controlled by said control means for actuation with either of said two two-way electromagnetic valves.

36. A servo-assisted steering arrangement for a vehicle comprising: piston and cylinder means for actuating the steering gear of said vehicle; a source of pressure medium; a plurality of electromagnetic valves controlling admission and release of said pressure medium to and from said piston and cylinder means to actuate said piston and cylinder means; electrically actuatable control means for controlling operation of said plurality of valves; sensing means for sensing actuation of a steering wheel of said vehicle and for providing an electrical control signal for controlling said electrically actuatable control means in response to said actuation of said steering wheel; two pressure sensing elements in the brake lines to the two steered wheels of said vehicle operated on by an anti-lock control system with separate control for said two steered wheels; first comparision means responsive to said pressure sensing elements for comparing brake pressure in said brake lines to said two steered wheels and for producing a deviation signal when said brake pressures are different; means for producing a deflection signal representatibe in magnitude and sense of deflection of said steered wheels; second comparison means for comparing said deflection signal with said deviation signal; and means for controlling said electromagnetic valves when said comparison means detects a deviation from a predetermined correlation to vary said steering gear accordingly.

* * * * *